United States Patent
Austad et al.

(10) Patent No.: US 6,839,302 B2
(45) Date of Patent: Jan. 4, 2005

(54) ACOUSTIC EMITTERS FOR USE IN MARINE SEISMIC SURVEYING

(75) Inventors: Peter Austad, Royken (NO); Rolf Rustad, Asker (NO)

(73) Assignee: WesternGeco, Houston, TX (US)

(*) Notice: Subject to any disclaimer, the term of this patent is extended or adjusted under 35 U.S.C. 154(b) by 0 days.

(21) Appl. No.: 10/275,037

(22) PCT Filed: May 1, 2001

(86) PCT No.: PCT/IB01/00725
§ 371 (c)(1),
(2), (4) Date: Jul. 3, 2003

(87) PCT Pub. No.: WO01/84186
PCT Pub. Date: Nov. 8, 2001

(65) Prior Publication Data
US 2004/0004907 A1 Jan. 8, 2004

(30) Foreign Application Priority Data
May 4, 2000 (GB) .............................. 0010636

(51) Int. Cl.[7] .............................................. G01V 1/38
(52) U.S. Cl. ...................... 367/19; 367/154; 367/130
(58) Field of Search ........................... 367/19, 20, 129, 367/130, 153, 154

(56) References Cited

U.S. PATENT DOCUMENTS

| | | | | |
|---|---|---|---|---|
| 4,087,780 A | * | 5/1978 | Itria et al. | 367/19 |
| 5,384,751 A | * | 1/1995 | Blier et al. | 367/154 |
| 5,668,775 A | * | 9/1997 | Hatteland | 367/19 |
| 5,943,293 A | * | 8/1999 | Luscombe et al. | 367/20 |
| 6,188,646 B1 | * | 2/2001 | Luscombe et al. | 367/154 |
| 6,229,760 B1 | * | 5/2001 | Ambs | 367/16 |

* cited by examiner

Primary Examiner—Ian J. Lobo
(74) Attorney, Agent, or Firm—Williams, Morgan & Amerson, P.C.

(57) ABSTRACT

An acoustic emitter for coupling in series in a marine seismic streamer is provided with an annular housing and an annular piezoelectric emitting element positioned coaxially within the housing. This form of construction permits the electrical or electro-optical transmission line which normally runs along the axis of the streamer to pass through the center of the emitting element, while also permitting the emitter to be spooled with the streamer.

16 Claims, 6 Drawing Sheets

ACOUSTIC EMITTERS FOR USE IN MARINE SEISMIC SURVEYING

This invention relates to acoustic emitters for use in marine seismic surveying, and is more particularly but not exclusively concerned with acoustic emitters for use in accurately determining the positions of the sensors in an array of seismic streamers being used to perform a 3D marine seismic survey.

In order to perform a 3D marine seismic survey, an array of marine seismic streamers, each typically several thousand meters long and containing a large number of hydrophones and associated electronic equipment distributed along its length, is towed at about 5 knots behind a seismic survey vessel, which also tows one or more seismic sources, typically air guns. Acoustic signals, or "shots", produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

In order to build up a positionally accurate representation of the earth strata, useful for example for determining the position at which a well should subsequently be drilled into the formations in order to enable hydrocarbons to be recovered, it is essential to determine accurately the respective positions of the seismic sources and the hydrophones for each shot produced by the seismic sources. Currently this is done using respective GPS receivers on the vessel and on one or more tailbuoys towed from the ends of the streamers remote from the vessel, in combination with an acoustic ranging and positioning system based on triangulation and comprising a plurality of relatively high frequency acoustic emitters, or "pingers", and acoustic receivers distributed throughout the streamer array. The GPS receivers are used to determine the respective "absolute" positions (ie latitude and longitude) of the vessel and the or each tailbuoy, typically to an accuracy of a few meters, while the acoustic ranging and positioning system is used to determine the respective positions of the sources and the hydrophones relative to the absolute positions of the GPS receivers. Acoustic ranging and positioning systems suitable for use in this context are described in our U.S. Pat. Nos. 4,992,990 and 5,668,775.

The acoustic ranging and positioning systems in current use typically comprise acoustic emitters which are mounted in housings disposed externally of the streamers. However, these externally mounted acoustic emitters suffer from several drawbacks. Firstly, they produce additional drag, vibrations and turbulence as the streamers are towed through the water, thus creating noise which contaminates the seismic data signals produced by the hydrophones in the streamers. Secondly, they need to be attached to and detached from the streamers when the streamers are deployed and recovered, which is time-consuming. And thirdly, they need batteries to power them, which can result in a battery running out during a survey.

It is an object of the present invention to provide an acoustic emitter which alleviates these drawbacks.

According to the present invention, there is provided an acoustic emitter for incorporation in a marine seismic streamer having an electrical or electro-optical transmission line extending therealong, the emitter comprising an annular housing adapted to be connected substantially coaxially in series with the streamer, and an annular acoustic emitting element mounted substantially coaxially within the housing, the arrangement being such that the acoustic emitting element surrounds the transmission line when the housing is connected in the streamer, and the housing protects the acoustic emitting element from bending loads during spooling of the streamer.

In a preferred implementation of the invention, for use where the streamer comprises a plurality of streamer sections connected together end to end, the acoustic emitter is implemented as an insert adapted to be connected between two adjacent streamer sections. In this case, the acoustic emitter preferably comprises first and second end connectors for connecting to respective ones of the two streamer sections, and a short flexible body interconnecting the end connectors, the annular housing forming part of one of the end connectors.

Advantageously, the emitting element is piezoelectric.

Thus, the emitting element may comprise an annular support member having a plurality of piezoelectric members mounted on its radially outer surface, advantageously in alignment with apertures provided in the housing.

Alternatively and preferably, the emitting element may comprise a stack of coaxially aligned annular piezoelectric discs. In this case, the discs are preferably mounted on an annular support member so as to be trapped between two annular end members, and a plurality of flexible barrel stave members extend between the end members so as to substantially completely surround the stack of piezoelectric discs and so as to be flexed by contraction and expansion of the stack of piezoelectric discs.

Advantageously, the emitting element is adapted to operate in the frequency range up to 10 kHz.

The invention also comprises a marine seismic streamer incorporating an acoustic emitter in accordance with any of the above statements of invention.

The invention will now be described, by way of example only, with reference to the accompanying drawings, of which.

Figure 1:
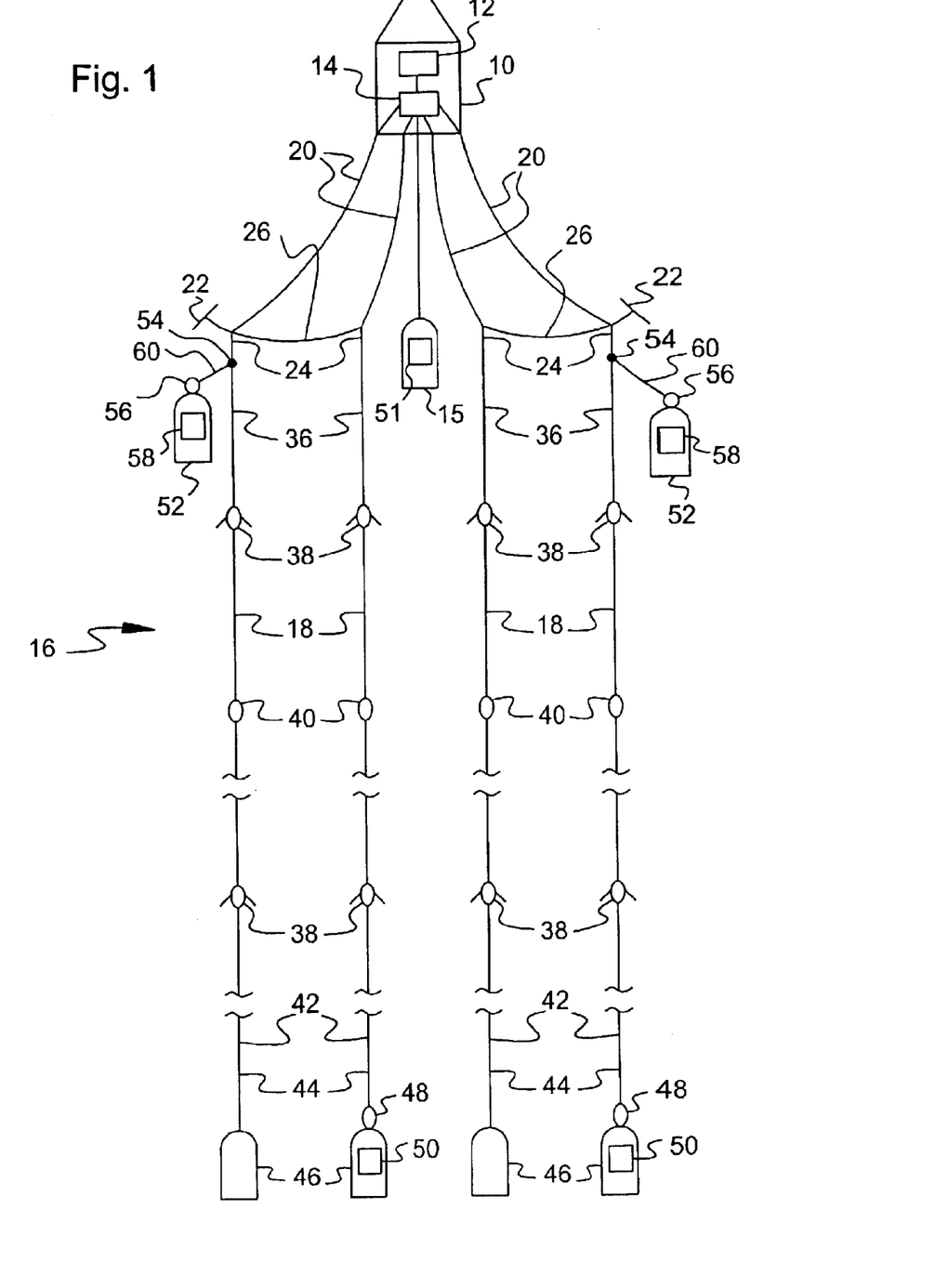
FIG. 1 is a somewhat schematic plan view of a seismic survey vessel performing a marine seismic survey using an array of seismic streamers incorporating acoustic emitters in accordance with the present invention.

The seismic survey vessel shown in FIG. 1 is indicated generally at 10, and is preferably as described in our PCT Patent Application No. PCT/GB98/01832 (WO 99/00295). The vessel 10 is provided with a GPS receiver 12 coupled to a data processor 14, and is shown towing a seismic source 15, typically a TRISOR multiple air gun source of the kind described in our U.S. Pat. No. 4,757,482, and an array 16 of four substantially identical streamers 18. However, it will be appreciated that, in practice, many more than four streamers can be towed, for example by using the techniques described in our PCT Patent Application No PCT/IB98/01435 (WO 99/15913). The streamers 18 are towed by means of their respective lead-ins 20 (ie the high strength steel- or fibre-reinforced electrical or electro-optical cables which convey electrical power, control and data signals between the vessel 10 and the streamers), and their spread is controlled by two MONOWING deflectors 22 of the kind described in our U.S. Pat. No. 5,357,892, connected to the respective forward ends 24 of the two outermost streamers. The deflectors 22 act in co-operation with respective spreader lines 26 connected between the forward end 24 of each outer streamer 18 and the forward end 24 of its adjacent streamer to maintain a substantially uniform spacing between the streamers.

Each streamer 18 can be generally as described in our PCT Patent Application No PCT/GB99/01544 (WO 99/60421), and more particularly as described in our PCT Patent Application No PCT/GB99/03541, and is made up of a large number of substantially identical streamer sections 18a connected together end to end by respective end connectors which will be described in more detail hereinafter.

Figure 2:
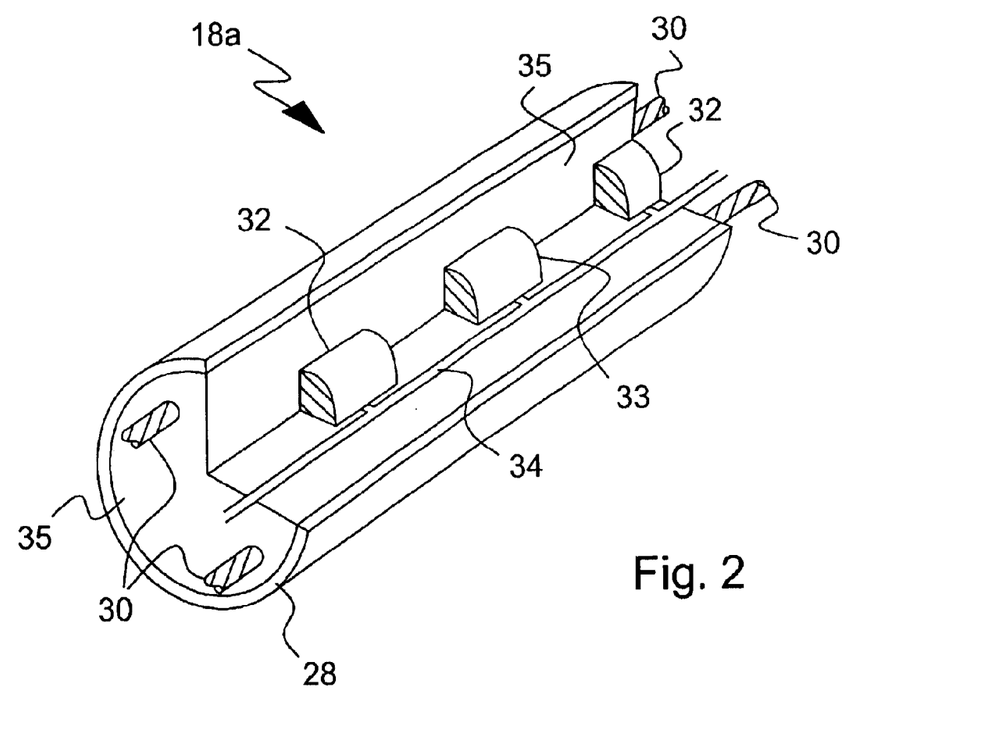
FIG. 2 is a highly schematic partly cut away view of a portion of one of the streamers of the streamer array of FIG. 1.

As best seen in FIG. 2, each streamer section 18a comprises a tubular outer plastics skin 28, which contains two elongate stress members 30, eg of Kevlar, and a multiplicity of hydrophones 32 substantially uniformly spaced apart along the longitudinal axis of the section. Sealed electronic units 33, typically one for every three of the hydrophones 32, are also positioned along the longitudinal axis of each streamer section 18a, and serve to digitise and partly process the respective output signals of their associated hydrophones, and to onwardly transmit the signals via an electro-optical power and signal transmission line 34 into which the hydrophones 32 and the electronic units are coupled. The rest of the interior space within the tubular skin 28 can be filled with kerosene-saturated plastics foam material 35, or with injected plastics material.

The forward end 24 of each streamer 18 comprises at least two stretch sections 36, which serve as vibration dampers to reduce the effect on the streamer of vibrations produced by the towing system connected to the forward end of the streamer.

Each streamer 18 has a plurality of "birds" 38, preferably of the kind described in our PCT Patent Application No PCT/GB97/03507 (WO 98/28636), distributed at 300–400 meter intervals therealong, for controlling the streamer's depth and steering it laterally. Additionally, each streamer 18 has a plurality of acoustic emitters (or "pingers") 40 in accordance with the present invention distributed therealong, the pingers being typically 800–1000 meters apart and interleaved between the birds 38.

The rearward ends 42 of the streamers 28, ie the ends remote from the vessel 10, are connected via respective stretch sections 44 similar to the stretch sections 36 to respective tailbuoys 46, the two outermost tailbuoys being provided with respective pingers 48 similar in principle to the pingers 40 and respective GPS receivers 50.

The seismic source 15 is also provided with a GPS receiver, indicated at 51,

As described in our co-pending United Kingdom Patent Application No 0001757.4, the array 16 is provided in the region of its forward end 24 with two further buoys or floats 52. More specifically, the further floats 52 are respectively connected to the two outermost streamers 18 at respective watertight electro-optical "tee" connectors 54 positioned between the two stretch sections 36 at the forward ends 24 of the outermost streamers, so as to be towed by the streamers. The buoys 52 can be substantially identical to the tailbuoys 46, are provided with respective pingers 56, again similar in principle to the pingers 40, and GPS receivers 58, and are connected to their respective connectors 54 by respective stretch sections 60. Although the buoys 52 are shown in FIG. 1 as offset with respect to their streamers for clarity, in practice they are substantially in line with the streamers.

In accordance with the present invention, the pingers 40 are designed to be incorporated in the streamers 18 (rather than being externally secured to them). This is achieved by incorporating each pinger 40 in a short insert, typically about a meter long, which can be connected in series between two adjacent streamer sections 18a, as will now be explained in more detail with reference to FIGS. 3 to 5.

Figure 3:
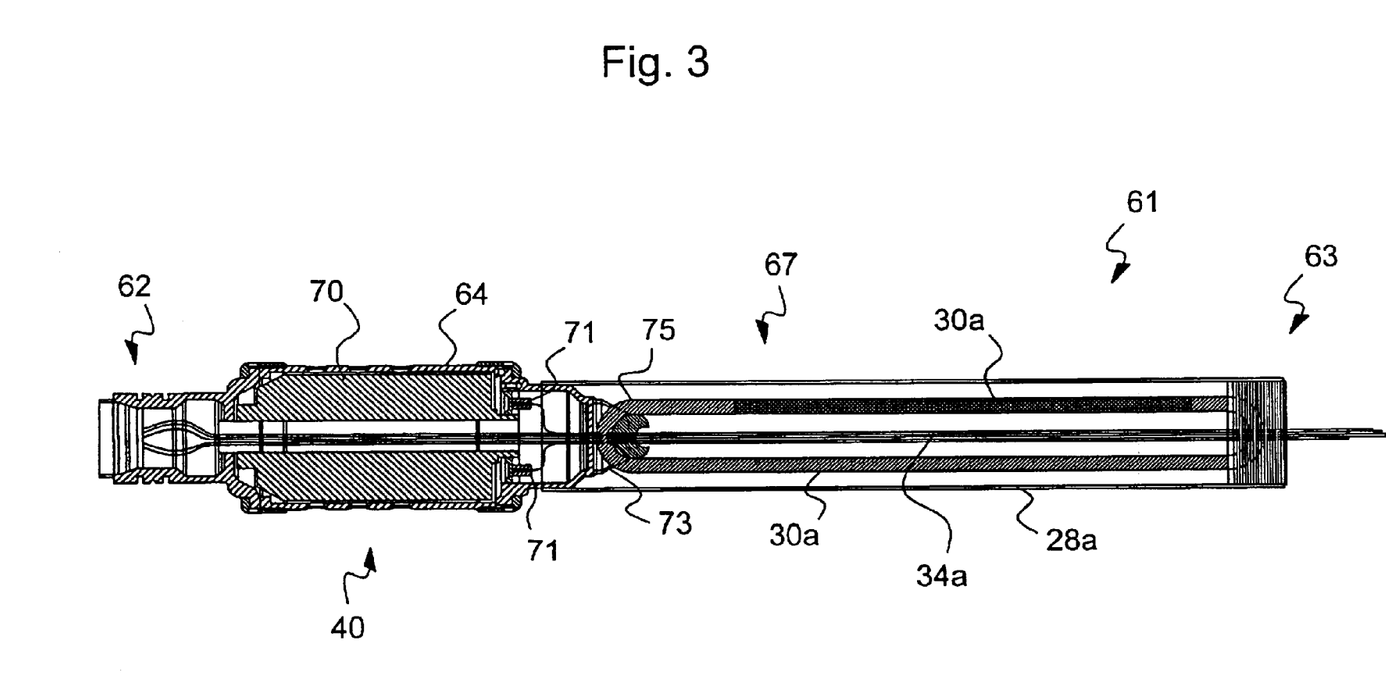
FIG. 3 shows in more detail how one of the acoustic emitters of FIG. 1 is incorporated into its streamer.

Thus the aforementioned insert is indicated at 61 in FIG. 3, and comprises male and female end connectors 62 and 63 which are adapted to connect the insert between respective complementary end connectors of two adjacent streamer sections 18a. The end connectors 62 and 63 are coupled together by a short flexible body 67, which is similar in construction to a short length of the streamer section of FIG. 2. More specifically, the body 67 comprises a tubular outer plastics skin 28a which contains two elongate stress members 30a made of high strength fibre material, and an electro-optical power and signal transmission line 34a. The stress members 30a, which are analogous to the stress members 30 of FIG. 2, mechanically couple together the end connectors 62 and 63, while the transmission line 34a electro-optically couples the end connectors 62 and 63 and is connected in series in, ie effectively forms a continuation of, the transmission line 34.

Figures 4, 5:
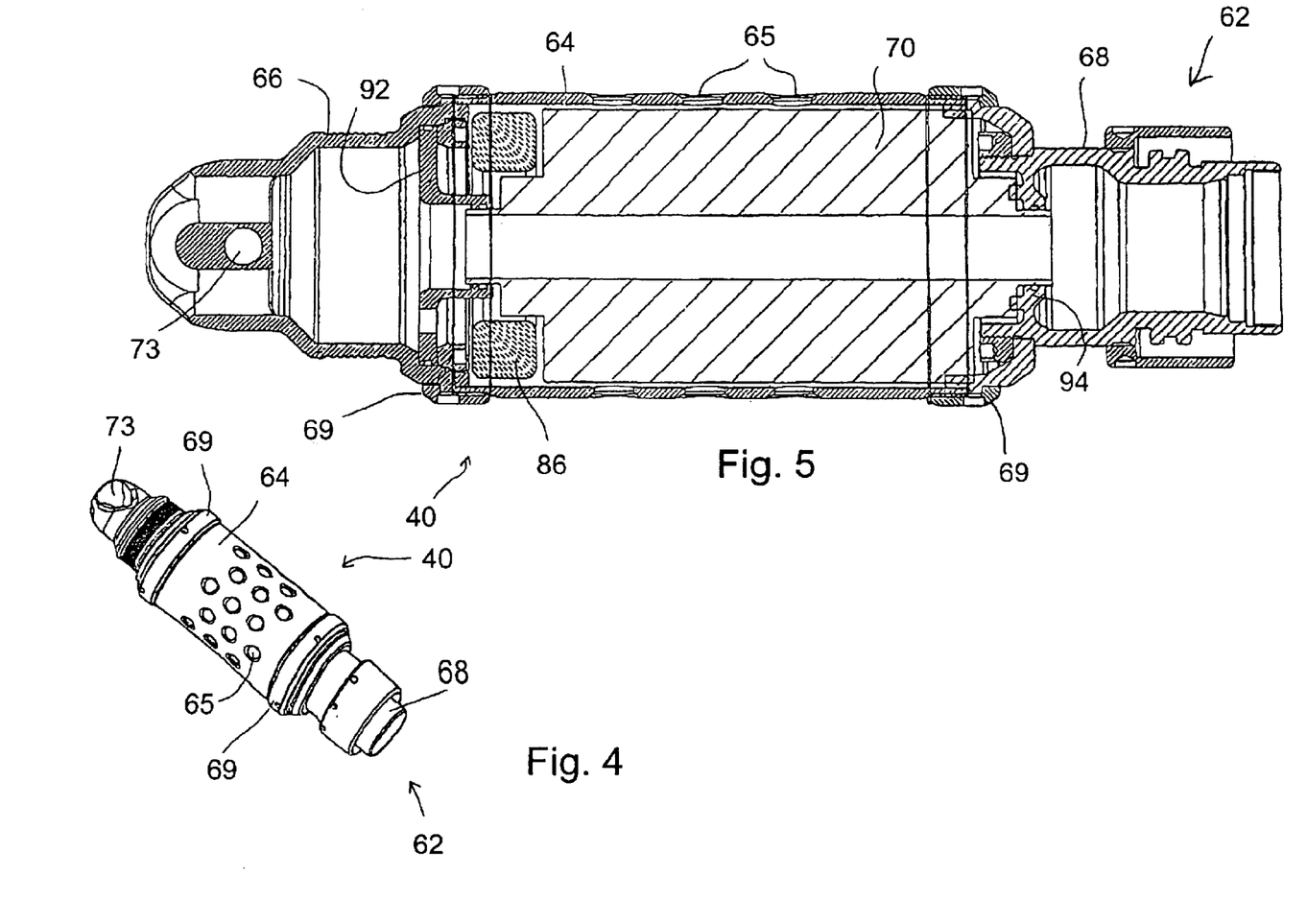
FIG. 4 is a perspective view of the acoustic emitter of FIG. 3.
FIG. 5 is a partly cutaway view of the acoustic emitter of FIG. 3.

The pinger 40 is incorporated in the male end connector 62 of the insert 61, as best seen in FIGS. 4 and 5. To this end, the pinger 40 comprises a generally tubular outer housing 64 which constitutes the centre part of the housing of the end connector 62, and which is connected between the opposite ends 66 and 68 of the end connector by means of respective locking rings 69. All of the elements 64, 66, 68 and 69 are made of titanium, not only for its corrosion resistance, but also for its lightness and strength, since these elements bear the loads applied to the streamer 18 during towing, and more particularly during spooling (or reeling in).

The housing 64 is provided with apertures 65

Figure 6:
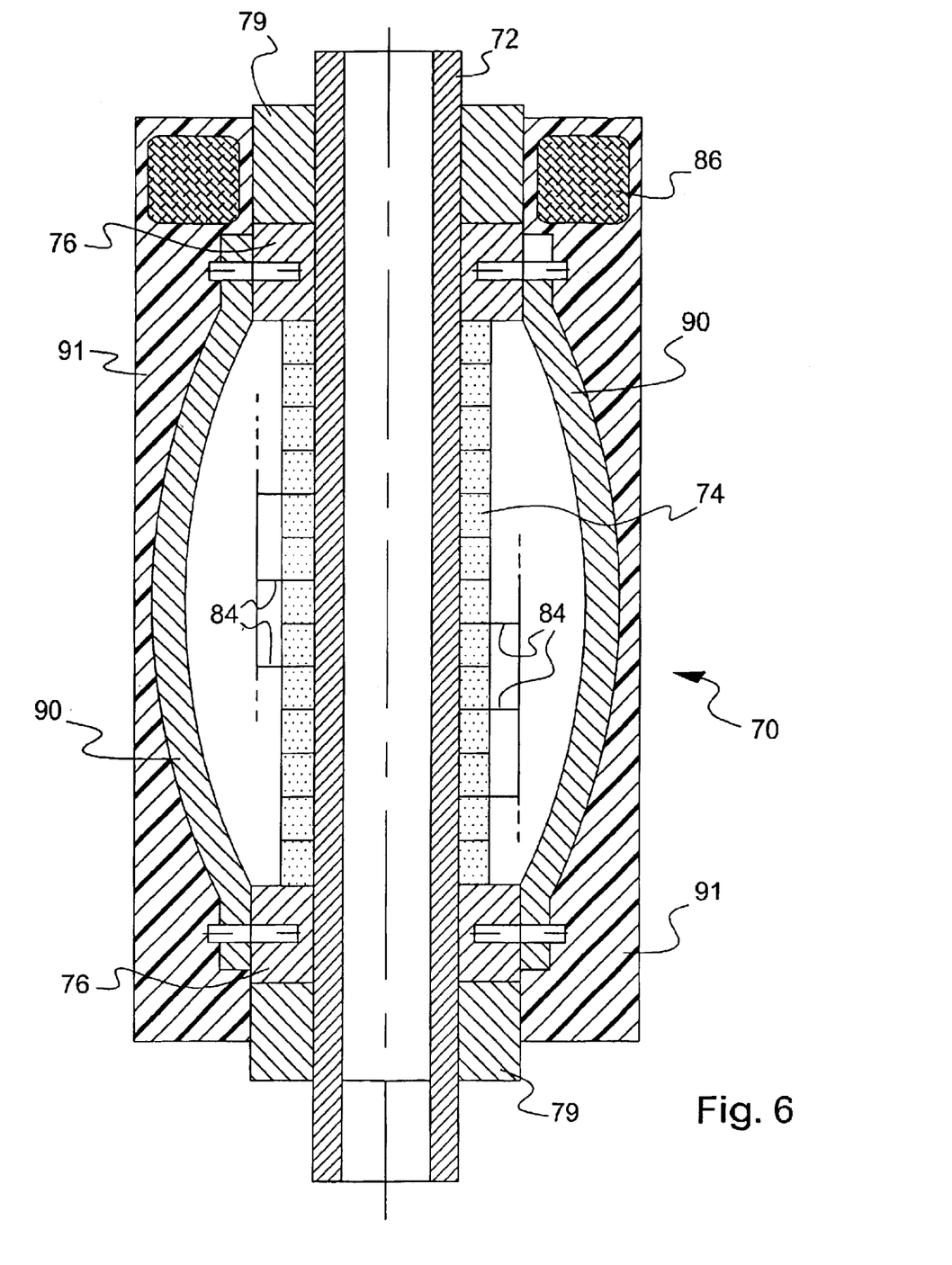
FIG. 6 is a longitudinal sectional view of the main components of the acoustic emitter of FIG. 3.

An annular piezoelectric transducer 70, which will be described in more detail with reference to FIG. 6, is mounted coaxially within the housing 64, the transducer being annular so that the electro-optical transmission line 34a can pass through it, as can be seen in FIG. 3. The transducer 70 has electrical inputs 71 connected to respective conductors of the transmission line 34a.

The end 66 of the end connector 62 is also generally tubular, and is provided with an eye 73 for receiving a loop 75 of high strength fibre material which interconnects the adjacent ends of the two stress members 30a, as best seen in FIG. 3. The fibre material of which the loop 75 is made is typically similar to the material of the stress members 30a, but slightly more flexible. It will be appreciated that the other ends of the stress members 30a are similarly connected to the female end connector 63 of the insert 61.

The end 68 of the end connector 62 is again generally tubular, and constitutes a mechanical coupling for connecting to a complementary mechanical coupler of the end connector of an adjacent streamer section 18a. The end 68 of the end connector 62 also contains an electro-optical coupler 77, to which the electro-optical transmission line 34a, after passing through the annular transducer 70 as mentioned earlier, is connected within the connector 62, and which couples to a complementary electro-optical coupler in the end connector of the adjacent streamer section 18a.

As shown in FIG. 6, the annular piezoelectric transducer 70 comprises a central tube 72 through which, in use, the electro-optical transmission line 34 passes, and an annular assembly comprising a stack of coaxially aligned annular piezoelectric discs 74 trapped between two collars 76 mounted coaxially on the tube. A small clearance exists between the discs 74 and the tube 72, while the two collars 76 sealingly engage the tube 72 by way of respective O-rings (not shown). The collars 76 are trapped in turn between two nuts 79 which are threaded onto the tube 72 to urge the collars into contact with the stack of discs 74, so pre-loading the discs.

The piezoelectric discs 74 are typically made of PZT (lead zirconate titanate), and are provided with respective electrodes 84 which are interleaved between them, alternate ones of these electrodes being connected to one end the output winding of an annular step-up transformer 86 and the others being connected to the other end of the winding, the input winding of the transformer 86 is connected to be driven from the transmission line 34a via the inputs 71 shown in FIG. 3.

Eight flexible bowed staves 90 made of aluminium are secured to and extend between the collars 76 at equi-angularly spaced apart positions around the collars, to form a barrel-like structure which surrounds the discs 74. This barrel-like structure, along with the transformer 86, is encased in a polyurethane potting compound 91 to form a substantially water-tight resilient cylindrical assembly whose outer diameter is just less than the internal diameter of the housing 64. This whole assembly is supported in the housing 64 by annular mounting structures 92 and 94 within the ends 66 and 68 respectively of the connector 62, which mounting structures engage the opposite ends of the tube 72 as shown in FIG. 5.

In operation, the transducer 70 within the pinger 40 is energised via the transmission line 34/34a and the transformer 86 with a unique spread spectrum electrical signal containing frequencies in the frequency band 0.5 kHz to 10 kHz, such signals being described in more detail in the aforementioned U.S. Pat. No. 5,668,775. This signal causes the stack of piezoelectric discs 74 to correspondingly contract and expand, so causing the flexible staves 80 to flex in and out to produce an acoustic signal corresponding to the unique spread spectrum electrical signal. The transmission of this acoustic signal into the water around the streamer is facilitated by the apertures 65 in the housing 64 of the pinger 40.

Because of their relatively low frequency, these acoustic signals can be detected by the hydrophones 32. Accordingly, selected ones of the hydrophones 32, in addition to being used to detect seismic data signals reflected from the earth strata beneath the seabed, are also used to detect the acoustic signals produced by the pingers 40 (or alternatively, extra hydrophones dedicated to detecting these acoustic signals can be provided in the streamers). As already mentioned, and as described in more detail in U.S. Pat. No. 5,668,775, the acoustic signals are used to accurately determine the positions of the hydrophones 32 with respect to one or more of the GPS receivers 12, 50, 51 and 58.

It will be appreciated that incorporating the pinger 40 in the insert 61, which is connected in series in, and is of substantially the same diameter as, the streamer 18, has little if any effect on the drag produced by the streamer, and so provides a marked improvement over the use of pingers which are attached externally. Incorporating the pinger 40 in the insert 61 also means that the pinger does not require a battery, since it is powered via the transmission line 34/34a.

The incorporation of the pinger 40 in the insert 61 is facilitated by the adoption of a pinger which produces acoustic signals in the 0.5kHz to 10 kHz range, since signals in this frequency range are less prone to reflection within the structure of the insert by virtue of their longer wavelength, and is further facilitated by the fact that the housing 64 is designed to bear the towing and spooling loads applied to the streamer 18, so protecting the transducers 70 from these loads. And finally, making the housing 64 from titanium has the unexpected benefit of lowering the resonant frequency of the transducer 70 by about 30%.

Many modifications can be made to the described embodiment of the invention.

Figure 7:
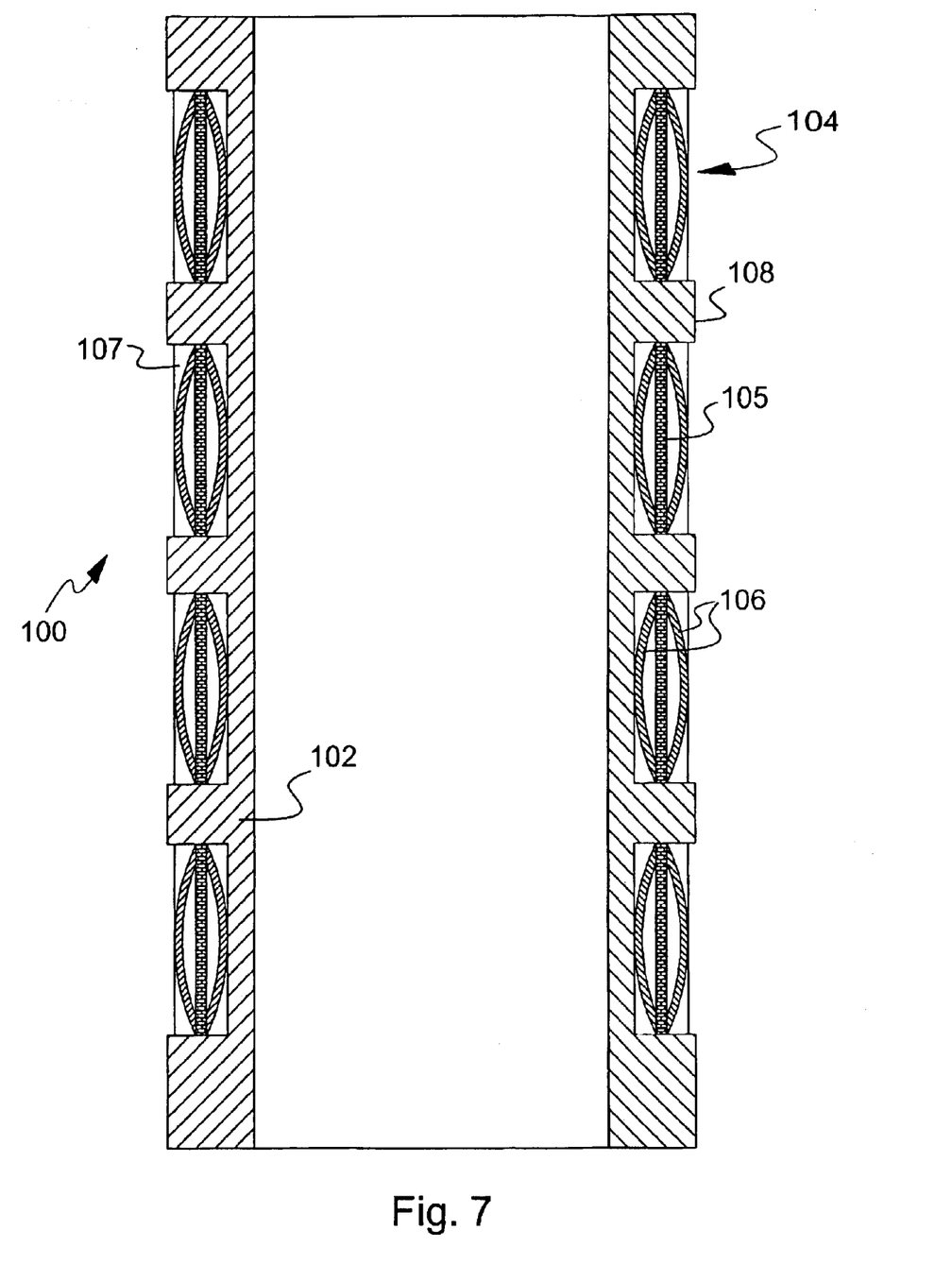
FIG. 7 is a longitudinal sectional view of another embodiment of an acoustic emitter in accordance with the present invention.

For example, the piezoelectric transducer 70 can be replaced by a piezoelectric transducer of the kind indicated at 100 in FIG. 7. Thus the transducer 100 comprises a cylindrical support member 102 having a plurality of radially outwardly facing individual piezoelectric emitters 104 mounted in respective recesses 106 in its external surface 108, preferably each in alignment with a respective one of the apertures 65 in the housing 64. Each of the emitters 104 comprises a respective piezoelectric plate-like member 105 having respective flexible bowed metallic plates 106 secured around its periphery on both sides. The transducer 100, by virtue of the size and position of the emitters 104, can operate in the same 80 kHz–100 kHz frequency range as the prior art externally mounted pingers. Since these prior art externally mounted pingers normally also include a dedicated receiver, if such a dedicated receiver is included along with the transducer 100 in the insert 61, the insert 61 can serve as a direct substitute for the prior art pinger in the prior art positioning system.

In another modification, the piezoelectric transducer 70 or 100 can be replaced by a suitable magnetostrictive transducer.

Although the invention has been described in the context of an acoustic positioning system which is used to determine the positions of the hydrophones 32 in the streamers 18, an acoustic emitter in accordance with the invention can be used in other contexts, for example in a positioning system which detects the positions of sensors positioned on the seabed. Indeed, an acoustic emitter in accordance with the invention can even be used as a seismic source in circumstances where a high powered source is not essential.

What is claimed is:

1. An acoustic emitter for incorporation in a marine seismic streamer having an electrical or electro-optical transmission line extending therealong, the emitter comprising an annular housing adapted to be connected substantially coaxially in series with the streamer, and an annular acoustic emitting element mounted substantially coaxially within the housing, the arrangement being such that the acoustic emitting element surrounds the transmission line when the housing is connected in the streamer, and the housing protects the acoustic emitting element from bending loads during spooling of the streamer.

2. An acoustic emitter as claimed in claim 1, for use where the streamer comprises a plurality of streamer sections connected together end to end, wherein the acoustic emitter is implemented as an insert adapted to be connected between two adjacent streamer sections.

3. An acoustic emitter as claimed in claim 2, further comprising first and second end connectors for connecting to respective ones of the two streamer sections, and a short flexible body interconnecting the end connectors, the annular housing forming part of one of the end connectors.

4. An acoustic emitter as claimed in claim 2 or claim 3, wherein said insert contains a sensor for sensing signals of the kind produced by the emitter.

5. An acoustic emitter as claimed in claim 1, wherein the emitting element is piezoelectric.

6. An acoustic emitter as claimed in claim 5, wherein the emitting element comprises an annular support member having a plurality of piezoelectric members mounted on its radially outer surface.

7. An acoustic emitter as claimed in claim 6, wherein the housing has a plurality of apertures extending radially therethrough, and the piezoelectric members are substantially aligned with the apertures in the housing.

8. An acoustic emitter as claimed in claim 5, wherein the emitting element comprises a stack of coaxially aligned annular piezoelectric discs.

9. An acoustic emitter as claimed in claim 8, wherein the piezoelectric discs are mounted on an annular support member so as to be trapped between two annular end members, and a plurality of flexible barrel stave members extend between the end members so as to substantially completely surround the stack of piezoelectric discs and so as to be flexed by contraction and expansion of the stack of discs.

10. An acoustic emitter as claimed in claim 1, wherein the housing has a plurality of apertures extending radially therethrough.

11. An acoustic emitter as claimed in claim 1, wherein the emitting element is adapted to operate in the frequency range up to 10 kHz.

12. An apparatus comprising a marine seismic streamer incorporating at least one acoustic emitter in accordance with any one of claims 1 to 3 and 5 to 11.

13. An apparatus as claimed in claim 12, the streamer including a multiplicity of sensors suitable for detecting seismic signals along its length, wherein at least some of said sensors are arranged to be used as part of a position determining system to detect acoustic signals of the kind produced by said acoustic emitter.

14. An apparatus as claimed in claim 13, wherein said at least some of said sensors are arranged to be used to detect both seismic and acoustic signals.

15. An apparatus as claimed in claim 13, wherein said sensors are hydrophones.

16. An apparatus as claimed in claim 12, wherein the acoustic emitter is coupled to said transmission line to be energised therefrom.

* * * * *